Jan. 16, 1923.
J. W. BAKER.
PIE OR CAKE CUTTER AND GAUGE.
FILED OCT. 23, 1922.
1,442,679.
3 SHEETS—SHEET 1.
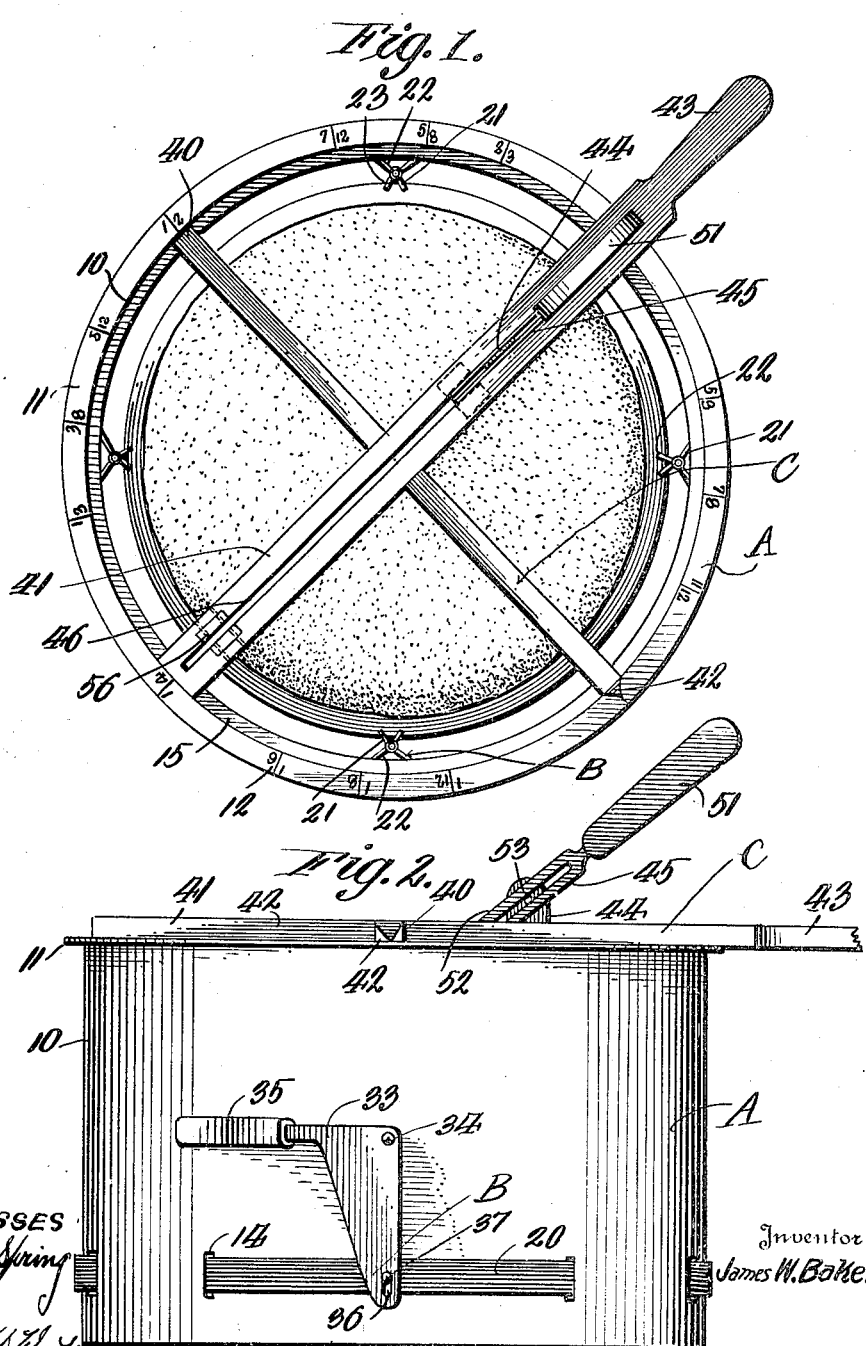

Jan. 16, 1923.
J. W. BAKER.
PIE OR CAKE CUTTER AND GAUGE.
FILED OCT. 23, 1922.
1,442,679.
3 SHEETS—SHEET 2.
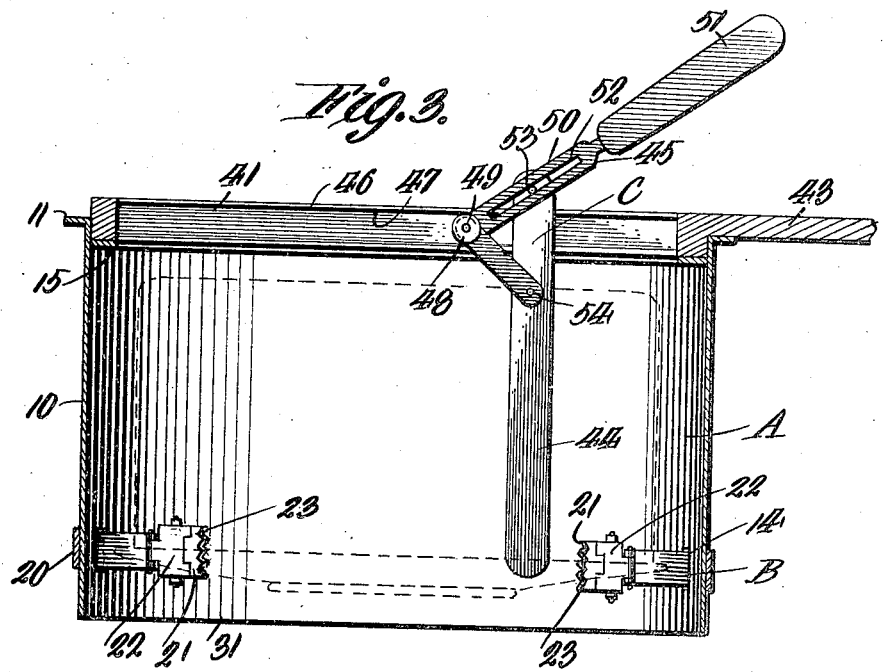
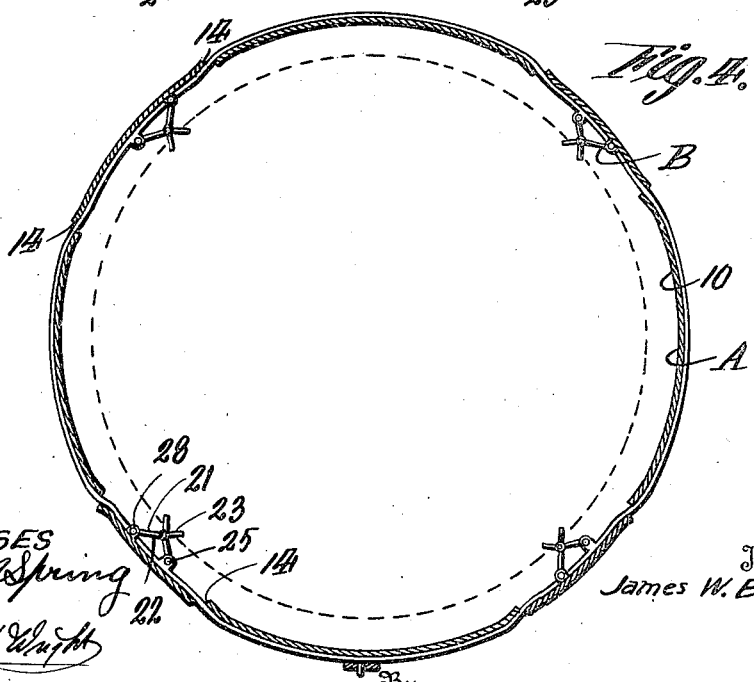
WITNESSES
Guy M. Spring
George W. Wright
Inventor
James W. Baker
By
Richard B. Owen, Attorney

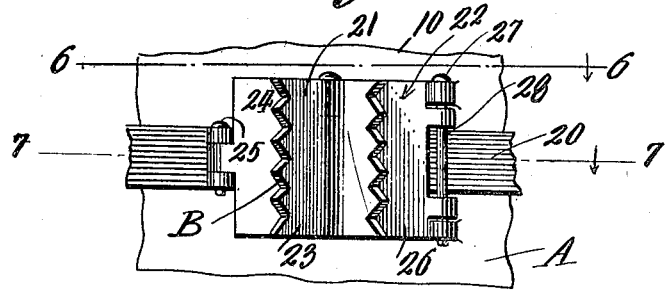
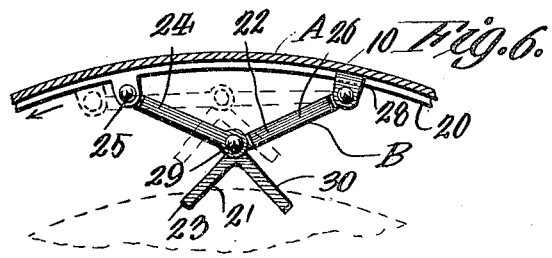
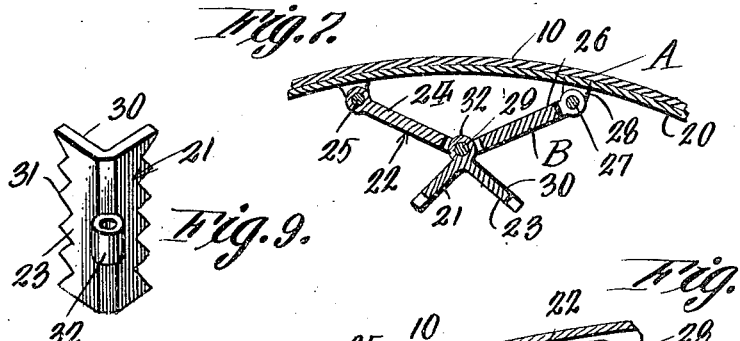
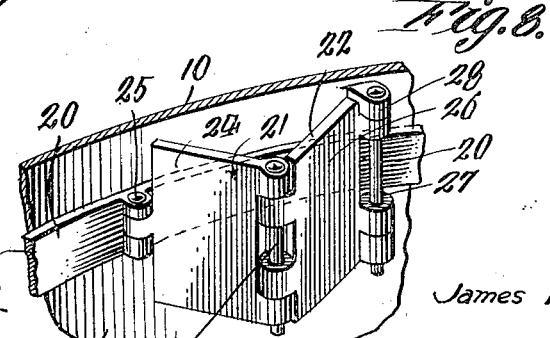

Patented Jan. 16, 1923.

1,442,679

UNITED STATES PATENT OFFICE.

JAMES W. BAKER, OF SANTA CRUZ, CALIFORNIA.

PIE OR CAKE CUTTER AND GAUGE.

Application filed October 23, 1922. Serial No. 596,494.

*To all whom it may concern:*

Be it known that I, JAMES WATSON BAKER, a citizen of the United States, residing at Santa Cruz, in the county of Santa Cruz and State of California, have invented certain new and useful Improvements in Pie or Cake Cutters and Gauges, of which the following is a specification.

This invention relates to cutters and gauges for food stuff and the primary object of the present invention is to provide a novel device for facilitating the cutting of pie and cake into sections of any desired size, the device being so constructed as to permit the pie or cake to be cut into any desired predetermined number of sections of equal size.

A further object of the invention is to provide a novel cake or pie cutter embodying a cylindrical shell or body for receiving the pie or cake and novel means for holding the pie or cake against movement in relation to the shell irrespective of the size of the cake or pie.

A further object of the invention is to provide a novel cake or pie cutter embodying a cylindrical shell or body for receiving the pie or cake having suitable graduations formed thereon for facilitating the cutting of the pie or cake into different sized sections and a novel gauge and cutting knife rotatably associated with the shell for cooperation with the graduations thereon for cutting the cake into the different sized sections.

A further object of the invention is to provide a novel knife for cutting the cake into different sections embodying a novel cutting blade and a novel means for operating the blade, said means permitting the knife to be swung into engagement with the cake or pie at an angle, and moved from the periphery thereof toward the axial center thereof.

A still further object of the invention is to provide an improved pie or cake cutter of the above character, which is durable and efficient in use, one that is simple and easy to manufacture, and one which can be placed upon the market at a reasonable cost.

With these and other objects in view, the invention consists in the novel construction, or arrangement and formation of parts, as will be hereinafter more specifically described, claimed and illustrated in the accompanying drawings, forming a part of this invention, in which drawings:

Figure 1 is a plan view of the improved pie or cake cutter, showing the same in operative position in relation to a cake, which is to be cut.

Figure 2 is a side elevation of the same.

Figure 3 is a diametric section through the improved pie or cake cutter.

Figure 4 is a horizontal section through the improved pie or cake cutter and gauge showing the novel clamping means associated therewith.

Figure 5 is an enlarged fragmentary elevation looking into the interior of the cake or pie cutter and gauge showing one of the novel clamps for engaging the pie or cake.

Figure 6 is an enlarged fragmentary horizontal section through the improved pie or cake cutter taken on the line 6—6 of Figure 5 looking in the direction of the arrows and showing one of the novel cake or pie clamps in plan.

Figure 7 is a similar section taken on the line 7—7 of Figure 5 looking in the direction of the arrows showing one of the pie or cake clamps in horizontal section.

Figure 8 is an enlarged fragmentary perspective view illustrating the toggle members and strap for forcing a clamping member into gripping engagement with the pie or cake, and Figure 9 is a detailed perspective view of one of the clamping members.

Referring to the drawings in detail, wherein similar reference characters designate corresponding parts throughout the several views, the letter A generally indicates the body of the improved pie or cake cutter and gauge, B the novel holding means for the pie or cake, and C the novel gauge and cutter.

The body A comprises a hollow cylindrical shell 10, which can be made of sheet metal of any desired gauge. This body A is formed of a sufficient height to enclose cakes of ordinary size and the upper edge of the shell 10 is provided with an outwardly extending integral flange 11, which is provided with suitable graduations 12 for facilitating the cutting of the pie or cake into different predetermined sizes.

A plurality of pairs of spaced vertical slots 14 are formed in the cylindrical shell 10 adjacent to the lower end thereof and these slots 14 receive the holding means B, which will be hereinafter more fully described. The inner surface of the cylindrical shell 10 adjacent to the upper end thereof is provided with an inwardly extending ledge or flange 15, on which the gauge and cutting means C is adapted to rest.

The improved cake or pie holding or clamping means B includes a circular strap 20, which can be formed of metal if so desired and this strap 20 is threaded through the pairs of slots 14, in such a manner, that portions of the strap will be positioned inside of the cylindrical shell 10. The portions of the strap 20 which are disposed inside of the cylindrical shell 10 are preferably arranged at quarters, but it is to be understood, the same can be arranged at other points if so desired.

The strap 20 serves as means for actuating the cake or pie clamping members 21, which as shown include pairs of toggle levers 22 and the cake or pie holding or gripping members 23. The toggle levers 22 and cake or pie gripping members 23 are disposed at quarters in relation to the cylindrical shell 10. As each of the pie and cake gripping members are constructed the same, only one will be described in detail. One section 24 of the pairs of toggle levers 22 is hingedly connected as at 25 with the strap 20, as can be clearly seen by referring to Figure 8 of the drawings. The other section 26 of the toggle levers 22 is pivotally connected by means of a suitable pivot pin 27, to ears 28, which are carried by the cylindrical shell 10. The sections 24 and 26 of the toggle levers are pivotally connected together by means of a pivot pin 29, which also supports the cake or pie gripping members 23. The cake or pie gripping members 23 each include a pair of angular related jaws 30, which can have their outer edges provided with saw teeth 31 for engaging the pie or cake, or the plate upon which they may be positioned. The vertex portion of the angular related jaws 30 carry a sleeve 32 for the reception of the pivot pin 29.

It is obvious that when the strap 20 is shifted in one direction that the toggle levers 22 will be swung inwardly, thereby forcing the cake or pie gripping members 21 into contact with the cake or pie or the plate upon which they may be positioned. In the drawings these gripping members are shown engaging a plate upon which the cake is positioned.

The strap 20 may be actuated in any preferred way, and by way of example, a bell crank lever 33 is pivoted at its angle, as at 34 to the outer surface of the cylindrical shell 10 at a point above the strap 20. One end of the bell crank 33 has secured thereto or formed thereon a suitable hand grip, 35, whereby the bell crank can be readily swung on its pivot. The other arm of the bell crank is provided with a slot 36 for the reception of a pin 37, which is secured to the strap 20. By swinging the bell crank on its pivot 34 the strap 20 can be shifted in either direction, which as stated will move the toggle levers inwardly toward the center of the shell or outwardly into engagement with the inner surface of the shell.

The novel pie or cake cutter and gauge C comprises a pair of right angularly disposed bars 40 and 41 which cross each other at the axial center of the shell 10 and these bars 40 and 41 can be secured together in any preferred way. As shown these bars extend diametrically across the shell and have their terminals resting upon the flange or ledge 15 and these bars are permitted to move about the shell on said flange or ledge. One terminal of the bar 40 is provided with an indicator 42 for cooperation with the graduations 12 marked on the flange 11 and this pointer is adapted to be moved into alignment with any one of the graduations according to the size of the cake, which is to be cut. One end of the bar 41 is extended above the flange 11 and extended outwardly therefrom a pre-determined distance to provide an operating or holding handle 43. The cutting knife 44 and the operating means 45 therefor are carried by the bar 41 which is provided with a centrally disposed longitudinally extending slot 46 through which the knife 44 protrudes.

The walls of the slot can be grooved to provide guide-ways 47 or the bar 41 can be made up of sections of channel iron. These guide-ways 47 receive rollers 48, which are mounted upon a suitable pivot pin or the like 49.

The operating means 45 for the knife 44 includes a pair of companion angle-shaped levers 50 between which, the knife 44 is adapted to be placed. The pivot pin 49 for the rollers 48 is passed through the companion angle levers 50 at the vertex portion thereof and these angle levers 50 are disposed between the rollers 48. The outer terminals of the arms of the angle levers which are disposed uppermost are connected and joined, by an actuating handle 51.

The knife blade 44 is formed of a relatively thin material and has its upper end disposed between the angle plates 50 which are provided with longitudinally extending slots 52 that receive a pin 53 carried by the upper end of the knife blade 44. The lower terminals of the angle levers 50 engage opposite sides of the knife blade 44 at a point below the upper end thereof and are connected to the knife blade by means of a suitable pivot pin or the like 54.

By swinging the handle portion 51 downwardly of the operating means 45 the knife can be swung downward at an angle into cutting engagement with the cake as clearly shown in Figure 3 of the drawings after which the knife and its operating means can be moved inwardly toward the axial center of the cake. When the handle portion 51 is swung upwardly and inwardly the knife blade 44 will be swung upward at an angle and away from the cake, as can be clearly seen from the foregoing.

In operation of the improved cake cutter and gauge, the shell 10 is placed upon a cake to be cut, after which the handle 35 is operated for sliding the strap 20 for moving the clamping or gripping members 21 into contact with the cake or the plate upon which the same is positioned. The handle 43 is now grasped and the bars 40 and 41 moved about the shell 10 until the indicator 42 comes into alignment with the desired graduation which indicates the size of the piece of cake to be cut, after which the handle 51 of the operating means 45 is swung downward which will force the knife into cutting engagement with the cake, as heretofore described.

One end of the bar 41 can be provided with suitable cutout portions 56, which communicate with the slot 46 and these cutout portions facilitate the placing of the rollers 48 into position in the guide-ways 47.

From the foregoing description, it can be seen that an improved pie or cake cutter and gauge has been provided of exceptionally simple and durable construction, which will positively hold the pie or cake against accidental movement during the cutting operation.

Changes in details may be made without departing from the spirit or scope of this invention.

What I claim as new is:—

1. A pie or cake cutter comprising a shell for receiving the pie or cake, clamping means carried by the shell for engaging the pie or cake, and cutting means rotatably associated with the shell.

2. In a pie or cake cutter, a cylindrical shell for receiving the article to be cut, adjustable clamping means associated with the shell for engaging different sized articles which are to be cut, and a swinging knife rotatably associated with the shell.

3. In a pie or cake cutter, a cylindrical shell for receiving the pie or cake, cutting means carried by the shell, and clamping means for the pie or cake including an annular strap slidably associated with the shell and means actuated by the strap for engaging the pie or cake.

4. In a pie or cake cutter, a cylindrical shell, cutting means associated with the shell, and clamping means carried by the shell including an annular strap slidably associated with the shell, means for actuating the strap, toggle levers pivotally connected with the strap and shell, and clamping members carried by the meeting sections of the toggle levers.

5. In a pie or cake cutter, a cylindrical shell, cutting means associated with the shell, cake or pie clamping means associated with the shell including an annular strap slidably carried by the shell, a bell crank pivoted at its angle to the shell, means operatively connecting one end of the bell crank to the strap, a handle carried by the opposite end of the bell crank, a plurality of pairs of toggle levers disposed at quarters in relation to the shell including pivotally connected sections, one of the sections being pivotally connected to the strap, and the other sections to the shell, and a clamp pivotally carried by the toggle levers at the meeting sections thereof including a pair of angularly disposed plates having saw teeth edges.

6. In a pie or cake cutter and gauge, a cylindrical shell, cake or pie clamping means associated with the shell, the shell having graduations formed thereon, a pair of angularly disposed bars rotatably associated with the upper end of the shell, an indicator carried by one of the bars for cooperation with the graduations on the shell, and a swinging knife associated with the other bar.

7. In a pie or cake cutter and gauge, a cylindrical hollow shell, cake or pie gripping means associated with the shell, an outstanding flange formed on the upper end of the shell having graduations formed thereon, a rim secured to the shell adjacent to the upper end thereof, a pair of right angularly disposed cross bars carried by said rim and movable thereon around said shell, an indicator carried by one end of one cross bar for cooperation with the graduations on the flange, the other cross bar having a longitudinally extending slot and guide-ways formed therein, a cutting knife extending through said slot, an angle lever disposed in said slot, rollers carried by the vertex portion of the angle lever and mounted in said guide-ways, means pivotally connecting the lower ends of the angle lever to the knife, the uppermost portion of the angle lever having a longitudinally extending slot therein, a pin slidably mounted in said slot and carried by the upper end of the knife, and an operating handle connected with the upper end of said angle lever.

In testimony whereof I affix my signature in presence of two witnesses.

JAMES W. BAKER.

Witnesses:
W. P. BELOK,
D. R. KIFF.